(12) United States Patent
Jiang

(10) Patent No.: US 12,736,789 B2
(45) Date of Patent: Sep. 15, 2026

(54) OPTICAL MODULE AND VR DEVICE

(71) Applicant: Changzhou AAC Raytech Optronics Co., Ltd., Changzhou City (CN)

(72) Inventor: Siyuan Jiang, Changzhou (CN)

(73) Assignee: Changzhou AAC Raytech Optronics Co., Ltd., Changzhou City (CN)

( * ) Notice: Subject to any disclaimer, the term of this patent is extended or adjusted under 35 U.S.C. 154(b) by 376 days.

(21) Appl. No.: 18/533,202

(22) Filed: Dec. 8, 2023

(65) Prior Publication Data

US 2024/0337821 A1 Oct. 10, 2024

(30) Foreign Application Priority Data

Apr. 10, 2023 (CN) ......................... 202310383881.9

(51) Int. Cl.
*G02B 13/18* (2006.01)
*G06F 1/16* (2006.01)

(52) U.S. Cl.
CPC ............. *G02B 13/18* (2013.01); *G06F 1/163* (2013.01)

(58) Field of Classification Search
CPC ........................... G02B 13/18; G02B 13/0035; G02B 13/0065; G02B 13/06; G02B 27/0101; G02B 2027/0123; G06F 1/163; Y02D 10/00
See application file for complete search history.

(56) References Cited

U.S. PATENT DOCUMENTS 9,651,768 B2 * 5/2017 Saito ......................... G02B 3/04
11,084,271 B1 * 8/2021 Gollier ................ B32B 38/1866
11,815,781 B2 * 11/2023 Brown ...................... G02F 1/29
12,196,917 B2 * 1/2025 Zhang ................ G02B 13/0065
2017/0038590 A1 * 2/2017 Jepsen ............... G02B 27/0101
2017/0255015 A1 * 9/2017 Geng ................... G02B 6/0008

FOREIGN PATENT DOCUMENTS

CN 115268071 B * 8/2025 ......... G02B 27/0172

* cited by examiner

*Primary Examiner* — Mustak Choudhury
(74) *Attorney, Agent, or Firm* — Wiersch Law Group

(57) ABSTRACT

The present disclosure discloses an optical module and a VR device. The optical module includes, from an image side to an object side, a first lens, a second lens and a third lens; a lamination film is attached on an image-side surface of the first lens, the lamination film comprising, from the image side to the object side, a reflective polarizing film and a quarter waveplate film; and the optical module further satisfying following conditions: $1.00 \leq f23/f \leq 1.50$; MAX SD≤27.00 mm; and Eyebox≥12.00*12.00 mm. The present disclosure not only solves the existing problem of small Eyebox, small FOV, the inability to achieve adjustable diopter, or the ability to achieve adjustable diopter but an adjustment structure being complex and a range of diopter adjustment being small, but also satisfies a use requirement for miniaturization and light weight of an optical module in a VR device.

9 Claims, 13 Drawing Sheets

OPTICAL MODULE AND VR DEVICE

TECHNICAL FIELD

The present disclosure relates to the technical field of virtual reality, in particular, to a camera optical module suitable for handheld terminal devices, such as smart phones and digital cameras, and imaging devices, such as monitors and PC lenses.

BACKGROUND

In virtual reality (VR), a computer technology is used as core in combination with a photoelectric sensing technology to generate a vivid virtual environment within a particular integration range of senses such as vision, hearing, touching and smelling. By using a VR device, a user may naturally and vividly interact with objects in a virtual world in real time, so as to have a feeling and experience as if the user is in a real environment of the same.

In order to achieve lightweight virtual reality devices, foldable optical path systems are usually used. Existing small-sized and lightweight VR foldable optical path systems mostly have problems such as small Eyebox, small FOV, inability to achieve adjustable diopter, or ability to achieve adjustable diopter but an adjustment structure is complex and a range of diopter adjustment is small.

SUMMARY

With regard to the above issues, the objective of the present disclosure is to provide an optical module and a VR device that solves the existing problem of small Eyebox, small FOV, the inability to achieve adjustable diopter, or the ability to achieve adjustable diopter but an adjustment structure is complex and a range of diopter adjustment is small.

In order to address the above issues, embodiments of the present disclosure provide an optical module, from an image side to an object side: a first lens, a second lens and a third lens; wherein a lamination film is attached on an image-side surface of the first lens, the lamination film comprising, from the image side to the object side, a reflective polarizing film and a quarter waveplate film; and the optical module further satisfying following conditions: $1.00 \leq f23/f \leq 1.50$; MAX SD≤27.00 mm; and Eyebox≥12.00*12.00 mm; where f denotes a focal length of the optical module, f23 denotes a combined focal length of the second lens and the third lens, MAX SD denotes a maximum semi-caliber of a lens of the optical module, and Eyebox denotes an eye box size of the optical module.

As an improvement, an image-side surface of the first lens is a plane surface, and an image-side surface and an object-side surface of the second lens are both aspherical surfaces.

As an improvement, the optical module satisfies following condition: $90.00° \leq FOV \leq 110.00°$, where FOV denotes a field of view of the optical module.

As an improvement, the optical module satisfies following conditions: TTL≤15.00 mm; and $TTL/f \leq 0.70$; where TTL denotes an on-axis distance from the image-side surface of the first lens to an object-side surface of the third lens.

As an improvement, an object-side surface of the third lens is coated with a transflective film, satisfying following conditions: $40.00\% \leq T \leq 60.00\%$; and $40.00\% \leq F \leq 60.00\%$; where T denotes a transmissive rate of the transflective film; and F denotes a reflective rate of the transflective film.

As an improvement, the reflective polarizing film has a transmissive rate greater than or equal to 95%.

As an improvement, the optical module has an optical distortion less than or equal to 35%.

As an improvement, the optical module has a chromatic aberration less than or equal to 100 μm.

As an improvement, the optical module has a diopter with an adjustment range of 0-7D.

In order to address the technical problem, an embodiment of the present disclosure further provides a VR device comprising the optical module.

The present disclosure is advantageous in: in the optical module provided in the present disclosure, a size of the optical module is reduced by attaching a lamination film on the image-side surface of the first lens to form a pancake-lens structure; by using a three-lens lens for optical path refraction and reflection, a total optical length is greatly shortened, which satisfies a use requirement for miniaturization and light weight of the optical module in a VR device; within the range of Eyebox≥12.00*12.00 mm, a user may see a good display at an optimal position without complex adjustment, and has better experience; an FOV may be enlarged to 90.00°-110.00°, so a VR user has better immersive feeling; the diopter is adjustable, providing a myopia user with an outstanding display experience; and the optical module is applicable to a display screen of 2.00-2.30 inches.

BRIEF DESCRIPTION OF DRAWINGS

In order to illustrate the technical solutions in the embodiments of the present disclosure more clearly, the drawings used in the description of the embodiments will be briefly described below. It is obvious that the drawings in the following description are only some embodiments of the present disclosure. For those skilled in the art, other drawings may also be obtained in accordance with the drawings without any inventive effort.

DETAILED DESCRIPTION OF EMBODIMENTS

To make the objects, technical solutions, and advantages of the present disclosure clearer, embodiments of the present disclosure are described in detail with reference to accompanying drawings in the following. A person of ordinary skill in the art can understand that, in the embodiments of the present disclosure, many technical details are provided to make readers better understand the present disclosure. However, even without these technical details and any changes and modifications based on the following embodiments, technical solutions required to be protected by the present disclosure can be implemented.

Embodiment 1

Figure 1:
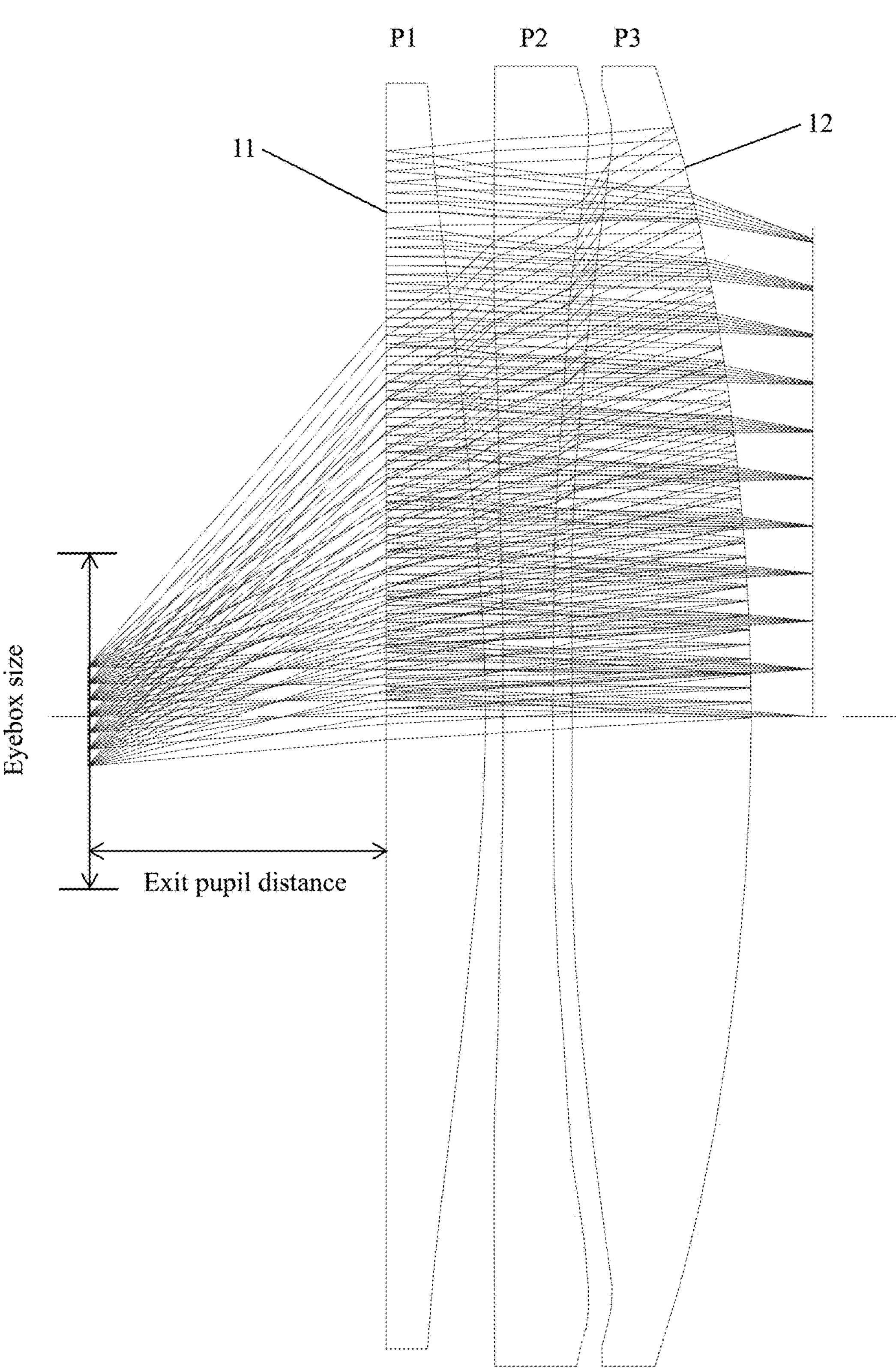
FIG. 1 is a schematic diagram of a structure of an optical module according to Embodiment 1 of the present disclosure.

With reference to FIG. 1, Embodiment 1 of the present disclosure provides an optical module 10 including three lenses. In particular, the optical module 10 includes, from an image side to an object side: a first lens P1, a second lens P2 and a third lens P3.

A lamination film 11 is attached on an image-side surface of the first lens P1, the lamination film 11 comprising, from an image side to an object side, a reflective polarizing film (not shown in the drawing) and a quarter waveplate film (not shown in the drawing). In this embodiment, the optical module 10 forms a pancake-lens structure by attaching the lamination film 11 on the image-side surface of the first lens P1, so as to reduce a size of the optical module 10. By using a three-lens lens for optical path refraction and reflection, a total optical length is greatly shortened, which satisfies a use requirement for miniaturization and light weight of the optical module 10 in a VR device.

An object-side surface of the third lens P3 is coated with a transflective film 12. After passing the transflective film 12, a light is reflected to form a reflected beam. It is easy for the reflected beam to be reflected on the third lens P3, so that light loss is avoided, reflective efficiency is improved, and imaging luminance is guaranteed.

Figure 2:
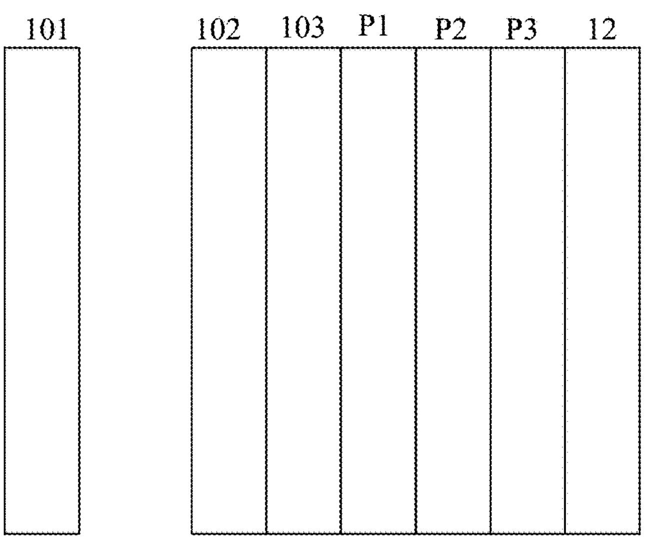
FIG. 2 is a schematic diagram of the optical module shown in FIG. 1 including a film structure.
Figure 3:
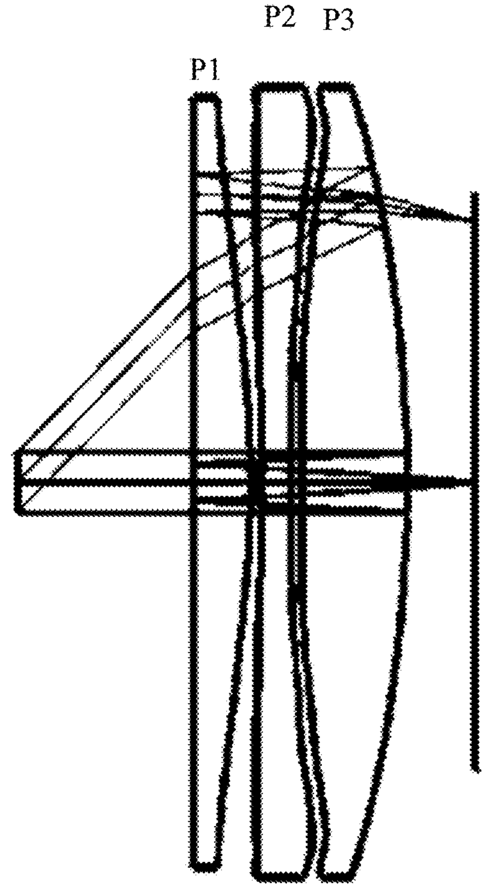
FIG. 3 is a light path diagram of the optical module according to Embodiment 1 under a diopter of 0.
Figure 4:
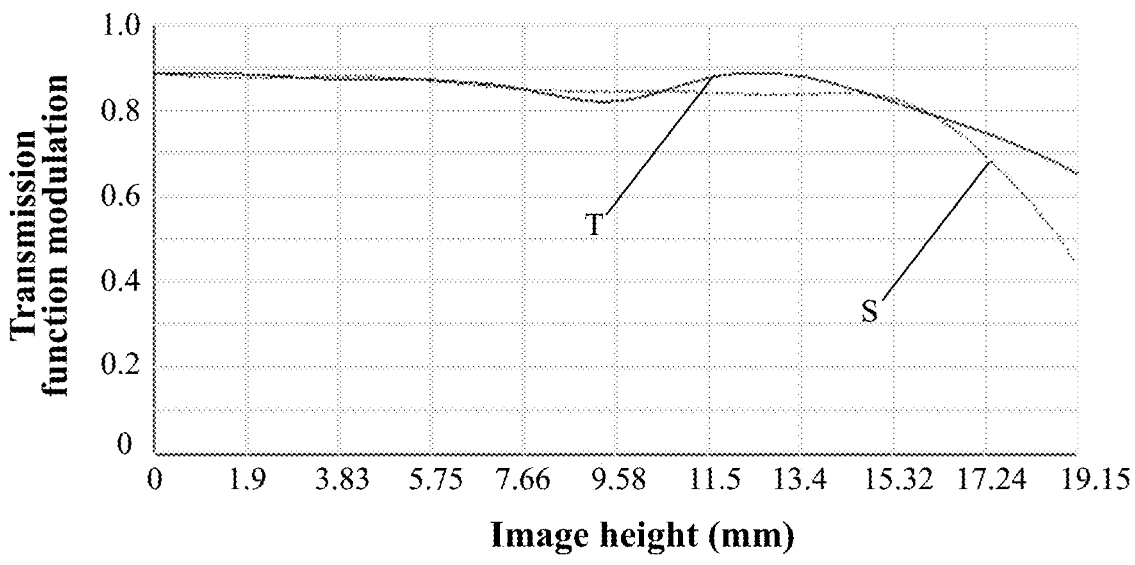
FIG. 4 is an MTF diagram of the optical module according to Embodiment 1 under the diopter of 0.
Figure 5:
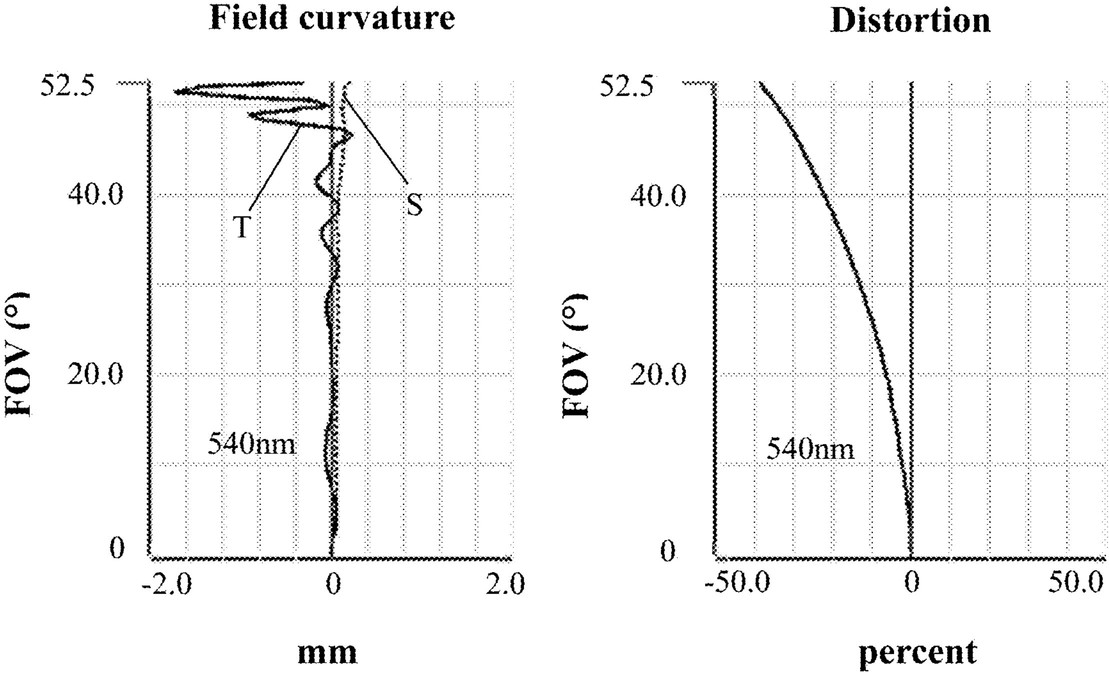
FIG. 5 is a schematic diagram of a field curvature and a distortion of the optical module according to Embodiment 1 under the diopter of 0.

As shown in FIG. 2, the optical module 10 is provided. The optical module 10 includes, from the image side to the object side, an image side 101, a reflective polarizing film 102, a quarter waveplate film 103, the first lens P1, the second lens P2, the third lens P3, the transflective film 12 and an object side 104. An optical path refraction and reflection principle in this embodiment is: a light at the object side 104 passes the third lens P3, the second lens P2, the first lens P1 and the quarter waveplate film 103 in sequence, and is reflected by the reflective polarizing film 102 to form a reflected light; the reflected light passes the quarter waveplate film 103, the first lens P1, the second lens P2 and the third lens P3 in sequence, and is reflected by the transflective film 12 on the object-side surface of the third lens P3 to form a second reflective light; and the second reflective light passes the third lens P3, the second lens P2, the first lens P1, the quarter waveplate film 103 and the reflective polarizing film 102 to reach the image side 101. Practically, on a transmission path of light, by attaching the quarter waveplate film 103 and the reflective polarizing film 102 to the image-side surface of the first lens P1, and by performing polarizing compensation on a polarized light transmitted between the first lens P1 and the reflective polarizing film 102, so that the polarized light transmitted to the reflective polarizing film 102 is a corresponding linear polarized light, light depolarization caused by birefringence of a lens may effectively be compensated, a ghost shadow may be removed and a light effect is guaranteed, so as to improve imaging quality and viewing of the user.

Further, a material for the first lens P1, the second lens P2 and the third lens P3 is not defined, as long as the material is transparent and can transmit light. In this embodiment, at least one of the first lens P1, the second lens P2 and the third lens P3 is plastic. In another embodiment, at least one of the first lens P1, the second lens P2 and the third lens P3 is glass. Compared with glass, plastic is preferable, because plastic has longer life of use, while glass is so fragile as to easily be broken by an external force.

In this embodiment, the image-side surface of the first lens P1 is a plane surface, and an image-side surface and an object-side surface of the second lens P2 are both aspherical surfaces. An aspherical design may adjust a focus position of a display image, so as to reduce a chromatic aberration and distortion of a display image and to improve imaging quality.

In this embodiment, a transmissive rate of the transflective film 12 is defined as T, a reflective rate of the transflective film 12 is defined as F, and the optical module 10 satisfies the following conditions: $40.00\% \le T \le 60.00\%$; and $40.00\% \le F \le 60.00\%$. This range facilitates improving reflective efficiency of light and guaranteeing imaging luminance.

In this embodiment, the reflective polarizing film has a transmissive rate greater than or equal to 95%. This range facilitates improving reflective efficiency and imaging quality.

In this embodiment, a focal length of the optical module 10 is defined as f, a combined focal length of the second lens P2 and the third lens P3 is defined as f23, a maximum semi-caliber of a lens of the optical module 10 is defined as MAX SD, and an eye box size of the optical module 10 is defined as Eyebox, and the optical module 10 further satisfies following conditions: $1.00 \le f23/f \le 1.50$; MAX SD≤27.00 mm; and Eyebox≥12.00*12.00 mm. Within the ranges specified by the conditions, a user may see a good display at an optimal position without complex adjustment. An experience is better, a field of view is enlarged, and viewing is improved. The eye box size in the embodiment is a sum of an entrance pupil diameter of the optical module 10 and an eye track range. Due to limitation to a lens design, as the eye track range is enlarging, imaging is getting poor. In this embodiment, when an eye track is ±4, functions of a full field of the optical module 10 is good, which improves a display experience of the user when a position of a VR device is not adjusted well.

In this embodiment, a field of view of the optical module 10 is FOV, satisfying a condition of 90.00°≤FOV≤110.00°. Within this range, a VR user has better immersive experience.

In this embodiment, an on-axis distance from the image-side surface of the first lens P1 to the object-side surface of the third lens P3 of the optical module 10 is defined as TTL, and the optical module 10 satisfies conditions of TTL≤15.00 mm and TTL/f≤0.70. This range facilitates achieving ultra-thinness.

In this embodiment, the optical module 10 has an optical distortion less than or equal to 35%.

In this embodiment, the optical module 10 has a chromatic aberration less than or equal to 100 μm.

In this embodiment, the optical module 10 has a diopter with an adjustment range of 0-7D, which provides a myopia user with outstanding display experience.

When the conditions are satisfied, the optical module 10 may be applied to display screens of 2.00-2.30 inches.

In Embodiment 1, design parameters of the optical module 10 in an example are as follows: the Eyebox is 12.00*12.00 mm, f23/f is 1.26, MAX SD is 26.20 mm, TTL is 14.695 mm, TTL/f is 0.61, FOV is 105°, an optical distortion is 35%, a chromatic aberration is 100 μm, and a size of a display screen is 2.1 inches.

Design data of the optical module 10 in Embodiment 1 of the present disclosure are shown in Table 1, Table 2 and Table 3.

Table 1 shows design values of optical components in the optical module 10 in Embodiment 1 of the present disclosure.

TABLE 1

| | R | | d | SD | | nd | | vd |
|---|---|---|---|---|---|---|---|---|
| IMAGE | ∞ | | ∞ | ∞ | | | | |
| STOP | ∞ | d0 = | 12.000 | 2.00 | | | | |
| R1 | Infinity | d1 = | 4.002 | 25.50 | n1 | 1.544 | v1 | 56.276843 |
| R2 | −69.279 | d2 = | 0.700 | 25.50 | | | | |
| R3 | 269.657 | d3 = | 2.000 | 26.20 | n2 | 1.658 | v2 | 21.002678 |
| R4 | 68.887 | d4 = | 0.782 | 26.20 | | | | |
| R5 | 1212.268 | d5 = | 7.211 | 26.20 | n1 | 1.544 | v1 | 56.276843 |
| R6 | −80.155 | d6 = | −7.211 | 26.20 | n1 | 1.544 | v1 | 56.276843 |
| R5 | 1212.268 | d7 = | −0.782 | 26.20 | | | | |
| R4 | 68.887 | d8 = | −2.000 | 26.20 | n2 | 1.658 | v2 | 21.002678 |
| R3 | 269.657 | d9 = | −0.700 | 26.20 | | | | |
| R2 | −69.279 | d10 = | −4.002 | 25.500 | n1 | 1.544 | v1 | 56.276843 |
| R1 | Infinity | d11 = | 4.002 | 25.500 | n1 | 1.544 | v1 | 56.276843 |
| R2 | −69.279 | d12 = | 0.700 | 25.500 | | | | |
| R3 | 269.657 | d13 = | 2.000 | 26.200 | n2 | 1.658 | v2 | 21.002678 |
| R4 | 68.887 | d14 = | 0.782 | 26.200 | | | | |
| R5 | 1212.268 | d15 = | 7.211 | 26.200 | n1 | 1.544 | v1 | 56.276843 |
| R6 | −80.155 | d16 = | 4.647 | 26.200 | | | | |

In the table, meanings of various symbols will be described as follows.

R: curvature radius of an optical surface, or central curvature radius of a lens;

R1: curvature radius of the image-side surface of the first lens P1;

R2: curvature radius of an object-side surface of the first lens P1;

R3: curvature radius of an image-side surface of the second lens P2;

R4: curvature radius of the object-side surface of the second lens P2;

R5: curvature radius of an image-side surface of the third lens P3;

R6: curvature radius of the object-side surface of the third lens P3;

d: on-axis thickness of a lens or on-axis distance between lenses;

d0: on-axis distance from the image surface to the object-side surface of the first lens P1;

d1: on-axis thickness of the first lens P1;

d2: on-axis distance from the object-side surface of the first lens P1 to the image-side surface of the second lens P2;

d3: on-axis thickness of the second lens P2;

d4: on-axis distance from the object-side surface of the second lens P2 to the image-side surface of the third lens P3;

d5: on-axis thickness of the third lens P3;

d6: on-axis distance from the object-side surface of the third lens P3 to the object surface;

d7: on-axis thickness of the third lens P3;

d8: on-axis distance from the object-side surface of the second lens P2 to the image-side surface of the third lens P3;

d9: on-axis thickness of the second lens P2;

d10: on-axis distance from the object-side surface of the first lens P1 to the image-side surface of the second lens P2;

d11: on-axis thickness of the first lens P1;

d12: on-axis distance from the object-side surface of the first lens P1 to the image-side surface of the second lens P2;

d13: on-axis thickness of the second lens P2;

d14: on-axis distance from the object-side surface of the second lens P2 to the image-side surface of the third lens P3;

d15: on-axis thickness of the third lens P3;

d16: on-axis distance from the object-side surface of the third lens P3 to the object surface;

TTL: on-axis distance from the image-side surface of the first lens P1 to the object-side surface of the third lens P3;

SD: semi-caliber of a lens;

nd: refractive index of a d line;

nd1: refractive index of a d line of the first lens P1;
nd2: refractive index of a d line of the second lens P2;
vd: abbe number;
v1: abbe number of the first lens P1;
v2: abbe number of the second lens P2.

Table 2 shows design values of aspherical surface coefficients in the optical module 10 in Embodiment 1 of the present disclosure.

TABLE 2

| | Conic coefficient | Aspherical surface coefficients | | | | | | |
|---|---|---|---|---|---|---|---|---|
| | k | A4 | A6 | A8 | A10 | A12 | A14 | A16 |
| R1 | | | | | | | | |
| R2 | −8.42E+01 | −2.80E−05 | −1.45E−06 | 6.23E−08 | −1.05E−09 | 1.04E−11 | −6.75E−14 | 3.05E−16 |
| R3 | 5.77E+01 | −1.94E−04 | 2.99E−06 | −6.13E−09 | −3.62E−10 | 5.67E−12 | −4.56E−14 | 2.36E−16 |
| R4 | −9.90E+01 | −4.13E−04 | 1.39E−05 | −2.44E−07 | 2.66E−09 | −1.94E−11 | 9.79E−14 | −3.52E−16 |
| R5 | 7.30E+01 | −2.25E−04 | 1.03E−05 | −2.02E−07 | 2.32E−09 | −1.73E−11 | 8.85E−14 | −3.22E−16 |
| R6 | −4.81E+01 | 1.11E−05 | −2.90E−07 | 3.71E−09 | −4.14E−11 | 3.72E−13 | −2.42E−15 | 1.10E−17 |
| R5 | 7.30E+01 | −2.25E−04 | 1.03E−05 | −2.02E−07 | 2.32E−09 | −1.73E−11 | 8.85E−14 | −3.22E−16 |
| R4 | −9.90E+01 | −4.13E−04 | 1.39E−05 | −2.44E−07 | 2.66E−09 | −1.94E−11 | 9.79E−14 | −3.52E−16 |
| R3 | 5.77E+01 | −1.94E−04 | 2.99E−06 | −6.13E−09 | −3.62E−10 | 5.67E−12 | −4.56E−14 | 2.36E−16 |
| R2 | −8.42E+01 | −2.80E−05 | −1.45E−06 | 6.23E−08 | −1.05E−09 | 1.04E−11 | −6.75E−14 | 3.05E−16 |
| R1 | | | | | | | | |
| R2 | −8.42E+01 | −2.80E−05 | −1.45E−06 | 6.23E−08 | −1.05E−09 | 1.04E−11 | −6.75E−14 | 3.05E−16 |
| R3 | 5.77E+01 | −1.94E−04 | 2.99E−06 | −6.13E−09 | −3.62E−10 | 5.67E−12 | −4.56E−14 | 2.36E−16 |
| R4 | −9.90E+01 | −4.13E−04 | 1.39E−05 | −2.44E−07 | 2.66E−09 | −1.94E−11 | 9.79E−14 | −3.52E−16 |
| R5 | 7.30E+01 | −2.25E−04 | 1.03E−05 | −2.02E−07 | 2.32E−09 | −1.73E−11 | 8.85E−14 | −3.22E−16 |
| R6 | −4.81E+01 | 1.11E−05 | −2.90E−07 | 3.71E−09 | −4.14E−11 | 3.72E−13 | −2.42E−15 | 1.10E−17 |

Table 3 shows design values of aspherical surface coefficients in the optical module 10 in Embodiment 1 of the present disclosure.

TABLE 3

| | Conic coefficient | Aspherical surface coefficients | | | | | | |
|---|---|---|---|---|---|---|---|---|
| | k | A18 | A20 | A22 | A24 | A26 | A28 | A30 |
| R1 | | | | | | | | |
| R2 | −8.42E+01 | −9.75E−19 | 2.23E−21 | −3.60E−24 | 4.02E−27 | −2.94E−30 | 1.27E−33 | −2.43E−37 |
| R3 | 5.77E+01 | −8.35E−19 | 2.07E−21 | −3.60E−24 | 4.30E−27 | −3.35E−30 | 1.54E−33 | −3.16E−37 |
| R4 | −9.90E+01 | 9.13E−19 | −1.70E−21 | 2.27E−24 | −2.09E−27 | 1.26E−30 | −4.45E−34 | 6.85E−38 |
| R5 | 7.30E+01 | 8.46E−19 | −1.62E−21 | 2.23E−24 | −2.16E−27 | 1.39E−30 | −5.38E−34 | 9.36E−38 |
| R6 | −4.81E+01 | −3.56E−20 | 8.14E−23 | −1.31E−25 | 1.46E−28 | −1.07E−31 | 4.63E−35 | −9.00E−39 |
| R5 | 7.30E+01 | 8.46E−19 | −1.62E−21 | 2.23E−24 | −2.16E−27 | 1.39E−30 | −5.38E−34 | 9.36E−38 |
| R4 | −9.90E+01 | 9.13E−19 | −1.70E−21 | 2.27E−24 | −2.09E−27 | 1.26E−30 | −4.45E−34 | 6.85E−38 |
| R3 | 5.77E+01 | −8.35E−19 | 2.07E−21 | −3.60E−24 | 4.30E−27 | −3.35E−30 | 1.54E−33 | −3.16E−37 |
| R2 | −8.42E+01 | −9.75E−19 | 2.23E−21 | −3.60E−24 | 4.02E−27 | −2.94E−30 | 1.27E−33 | −2.43E−37 |
| R1 | | | | | | | | |
| R2 | −8.42E+01 | −9.75E−19 | 2.23E−21 | −3.60E−24 | 4.02E−27 | −2.94E−30 | 1.27E−33 | −2.43E−37 |
| R3 | 5.77E+01 | −8.35E−19 | 2.07E−21 | −3.60E−24 | 4.30E−27 | −3.35E−30 | 1.54E−33 | −3.16E−37 |
| R4 | −9.90E+01 | 9.13E−19 | −1.70E−21 | 2.27E−24 | −2.09E−27 | 1.26E−30 | −4.45E−34 | 6.85E−38 |
| R5 | 7.30E+01 | 8.46E−19 | −1.62E−21 | 2.23E−24 | −2.16E−27 | 1.39E−30 | −5.38E−34 | 9.36E−38 |
| R6 | −4.81E+01 | −3.56E−20 | 8.14E−23 | −1.31E−25 | 1.46E−28 | −1.07E−31 | 4.63E−35 | −9.00E−39 |

Herein, k is a conic coefficient, A4, A6, A8, A10, A12, A14, A16, A18, A20, A22, A24, A26, A28 and A30 are aspherical surface coefficients, r is a vertical distance from a point on an aspherical surface curve to the optical axis, and z is an aspherical surface depth (a vertical distance between a point on the aspherical surface which is of the distance of r from the optical axis, and a tangent surface that is tangent with a top point of the optical axis of the aspherical surface).

$$z = (cr^2)/\left[1 + \{1(k+1)(c^2r^2)\}^{1/2}\right] + A4x^4 + A6x^6 + A8x^8 + A10x^{10} + A12x^{12} + A14x^{14} + A16x^{16} + A18x^{18} + A20x^{20} \quad (1)$$

For convenience, an aspherical surface of each lens surface is an aspherical surface shown in the above formula (1). However, the present disclosure is not limited to the aspherical polynomials as shown in the formula (1).

FIGS. 4, 9, 14 and 19 are MTF diagrams of the optical module 10 in Embodiment 1 under the diopter of 0, when the eye track is ±4, under the diopter of 4D and under the diopter of 7D, respectively. T is an MTF curvature measured under 25 line pairs/millimeters in a tangential direction, and S is an MTF curvature measured under 25 line pairs/millimeters in a sagittal direction.

FIGS. 5, 10, 15 and 20 illustrates a field curvature and a distortion of a light having a wavelength of 540 nm after passing the optical module 10 according to Embodiment 1 under the diopter of 0, when the eye track is ±4, under the diopter of 4D and under the diopter of 7D, respectively. Herein, T is a field curvature in a tangential direction, and S is a field curvature in a sagittal direction.

Figure 6:
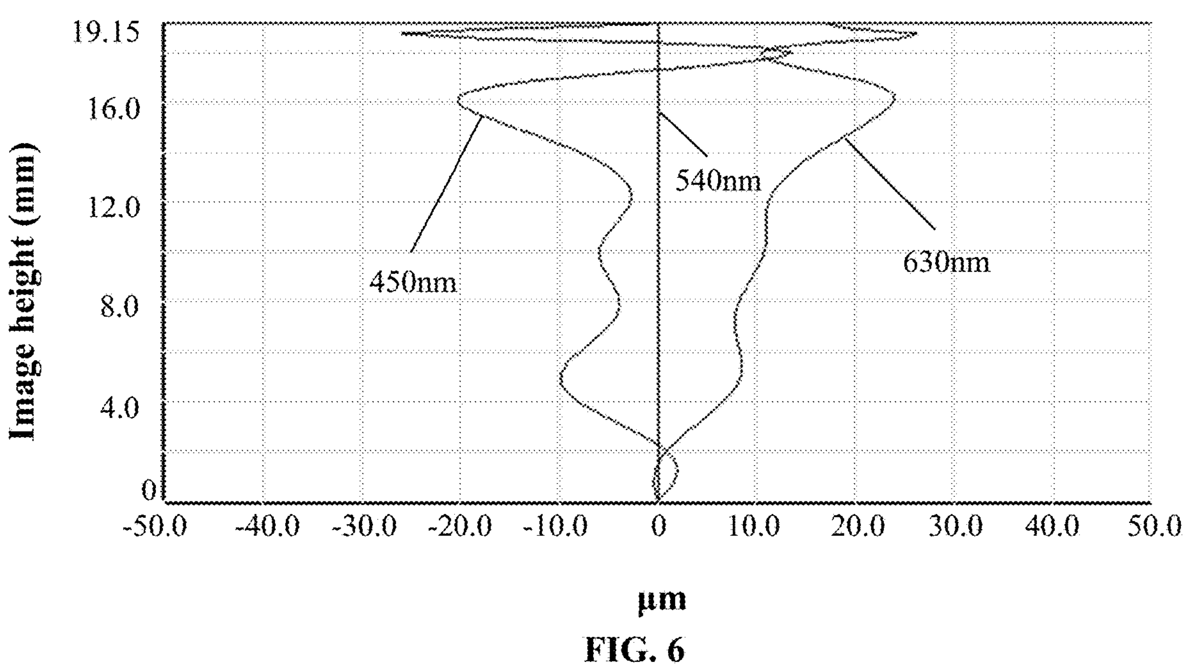
FIG. 6 is a schematic diagram of a chromatic lateral aberration of the optical module according to Embodiment 1 under the diopter of 0.
Figure 11:
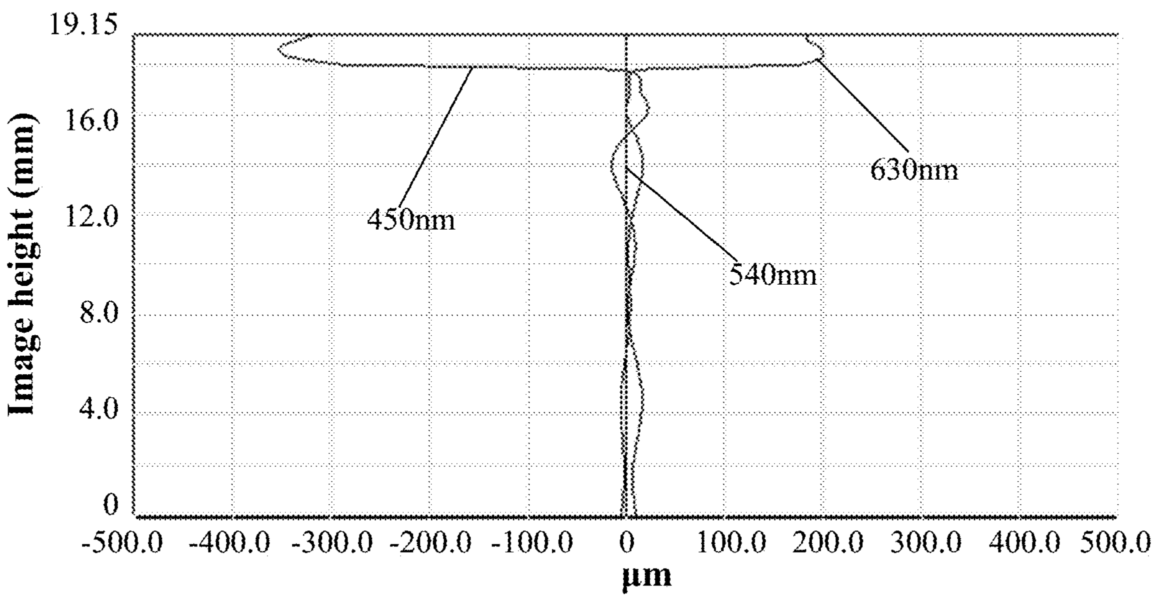
FIG. 11 is a schematic diagram of a chromatic lateral aberration of the optical module according to Embodiment 1 when the eye track is ±4.
Figure 16:
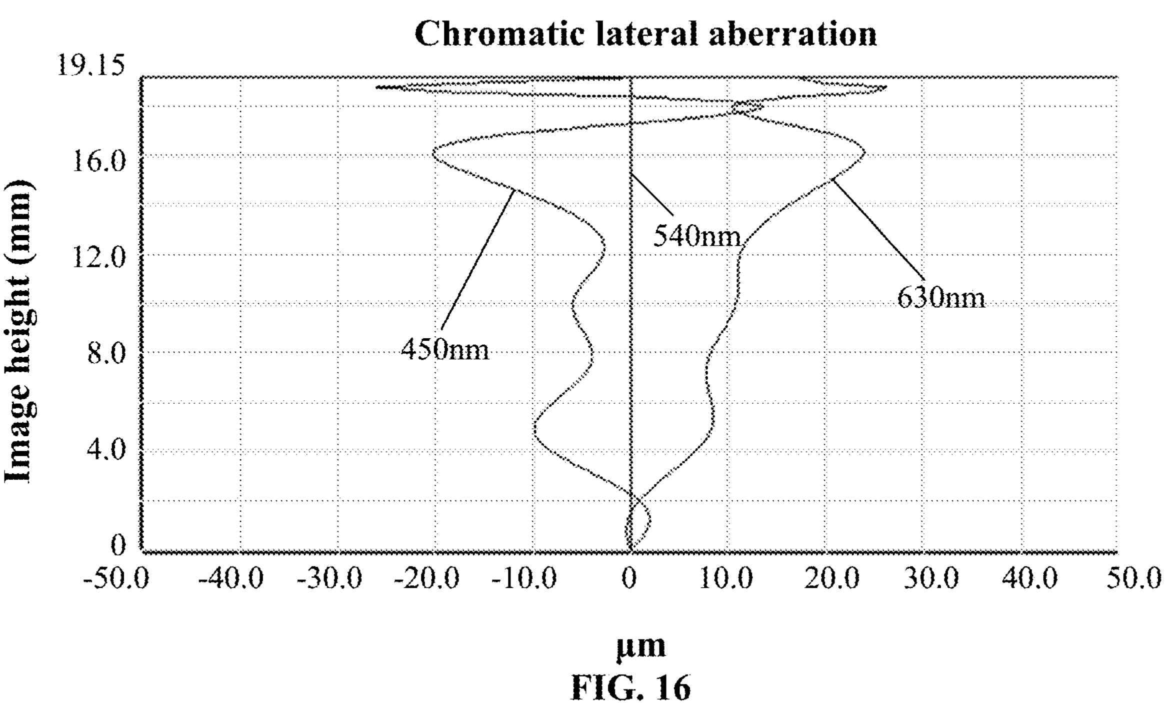
FIG. 16 is a schematic diagram of a chromatic lateral aberration of the optical module according to Embodiment 1 under the diopter of 4D.
Figure 21:
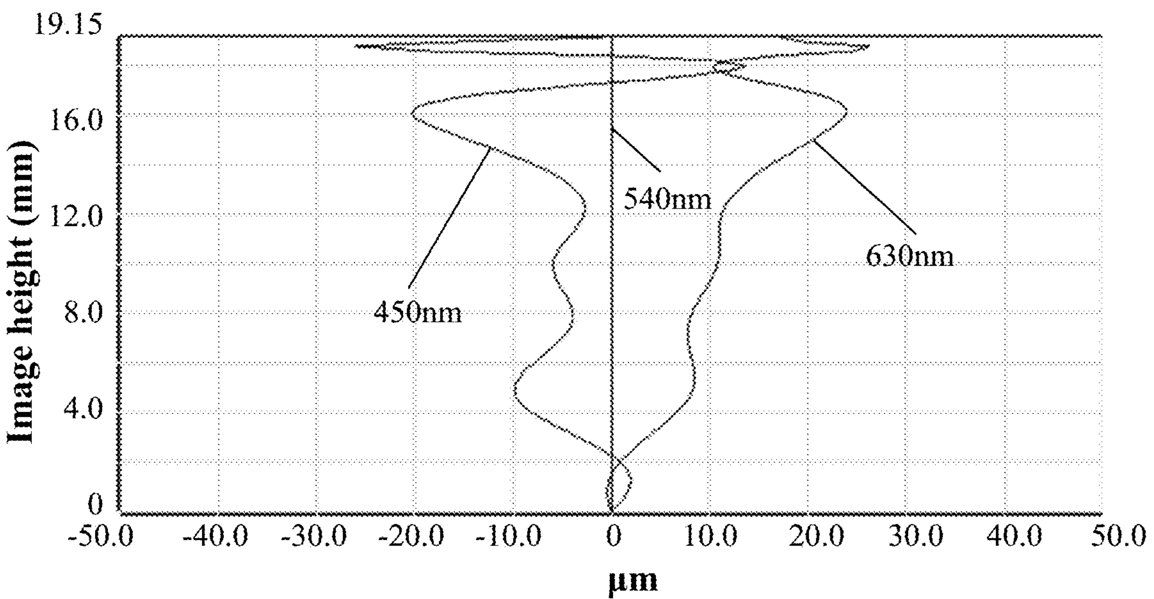
FIG. 21 is a schematic diagram of a chromatic lateral aberration of the optical module according to Embodiment 1 under the diopter of 7D.

FIG. 6 respectively illustrates a chromatic lateral aberration of lights having wavelengths of 630 nm, 540 nm, 450 nm after passing the optical module 10 according to Embodiment 1 under the diopter of 0. FIG. 11 respectively illustrates a chromatic lateral aberration of lights having wavelengths of 630 nm, 540 nm, 450 nm after passing the optical module 10 according to Embodiment 1 when the eye track is ±4. FIG. 16 respectively illustrates a chromatic lateral aberration of lights having wavelengths of 630 nm, 540 nm, 450 nm after passing the optical module 10 according to Embodiment 1 under the diopter of 4D. FIG. 21 respectively illustrates a chromatic lateral aberration of lights having wavelengths of 630 nm, 540 nm, 450 nm after passing the optical module 10 according to Embodiment 1 under the diopter of 7D.

Figure 7:
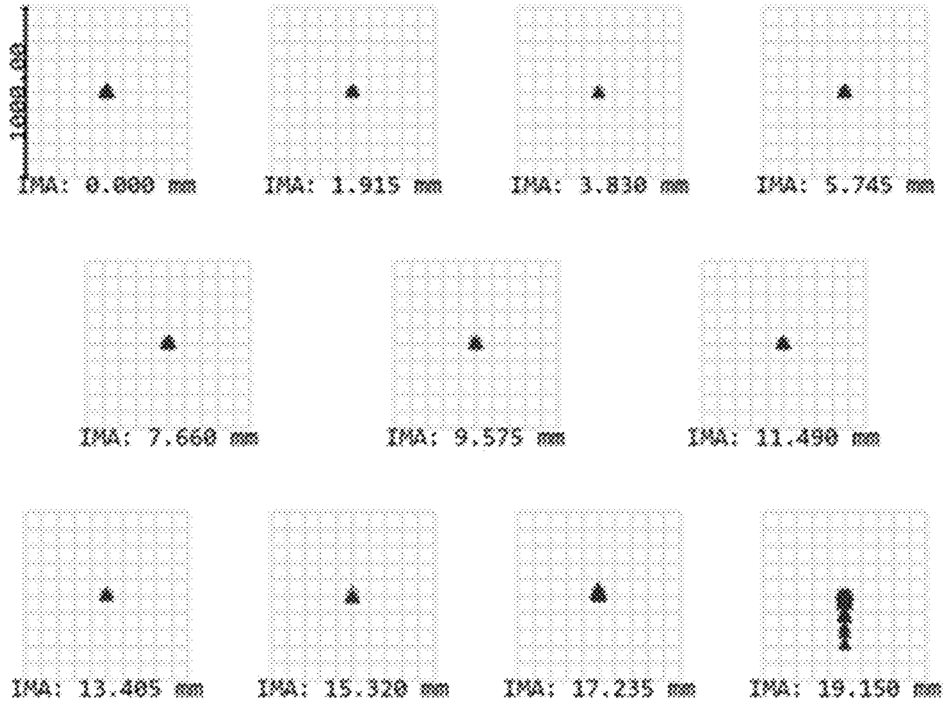
FIG. 7 is a spot diagram of the optical module according to Embodiment 1 under the diopter of 0.
Figure 8:
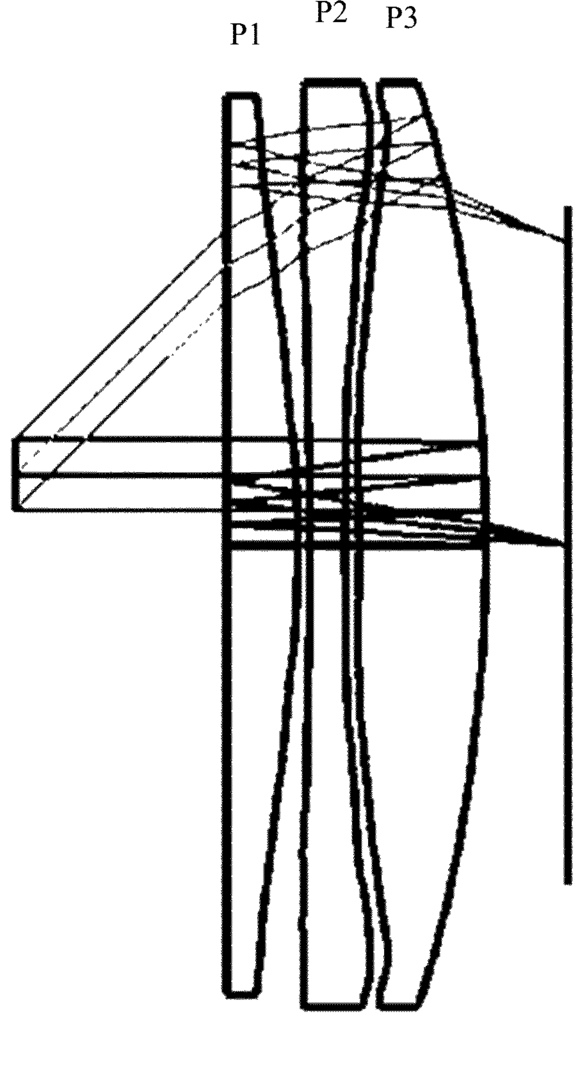
FIG. 8 is a light path diagram of the optical module according to Embodiment 1 when an eye track is ±4.
Figure 9:
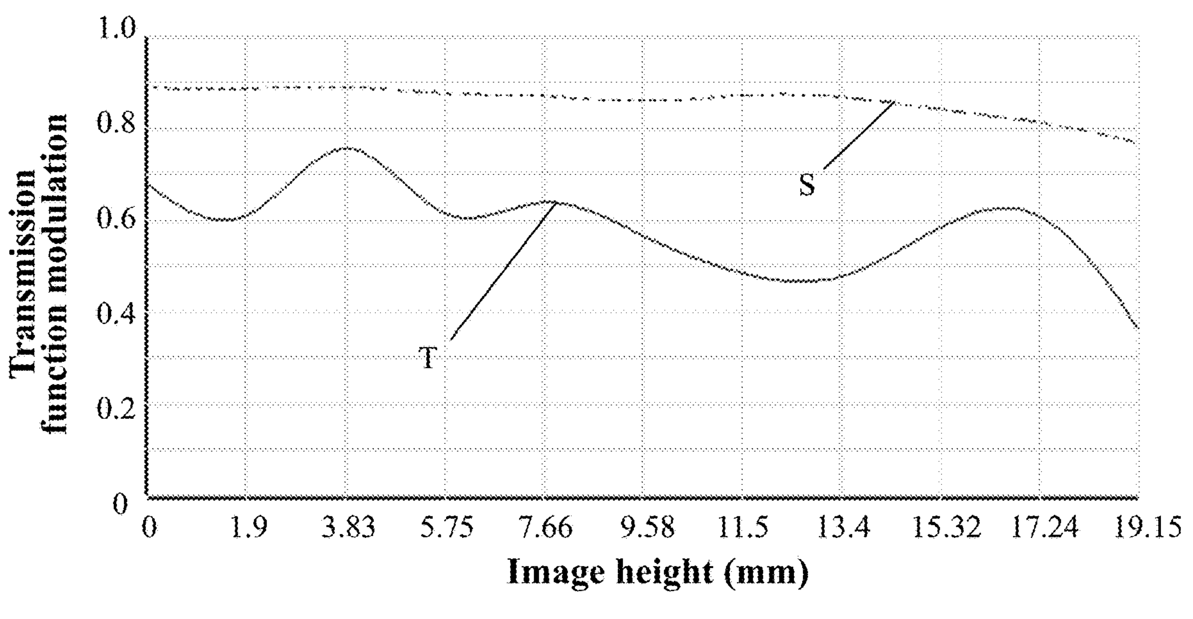
FIG. 9 is an MTF diagram of the optical module according to Embodiment 1 when the eye track is ±4.
Figure 10:
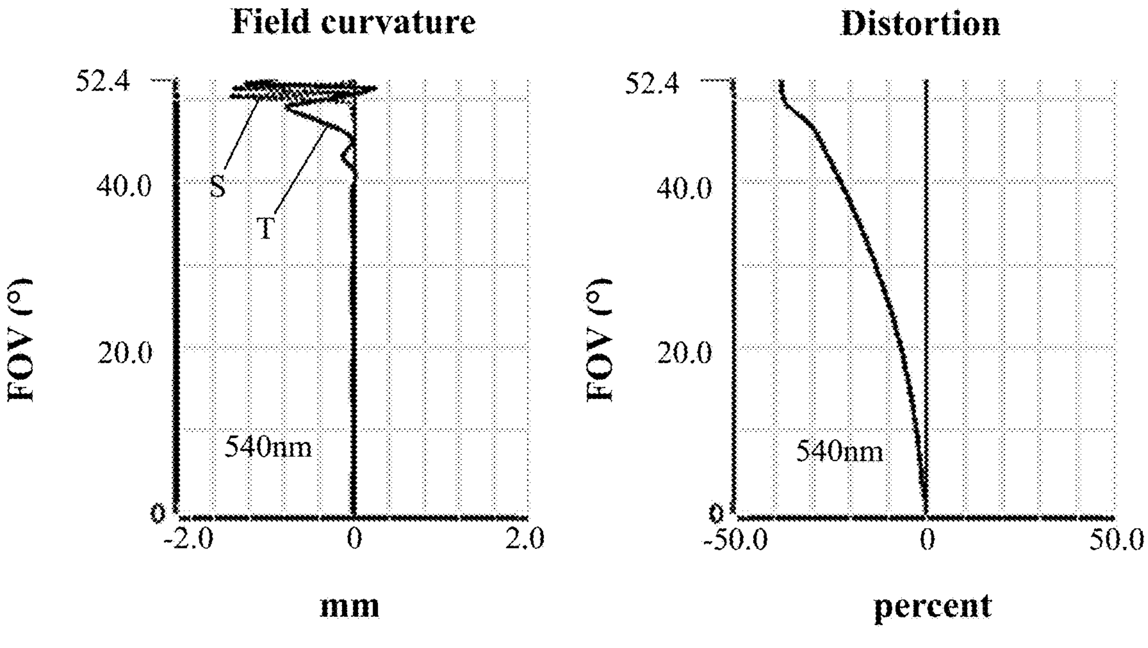
FIG. 10 is a schematic diagram of a field curvature and a distortion of the optical module according to Embodiment 1 when the eye track is ±4.
Figure 12:
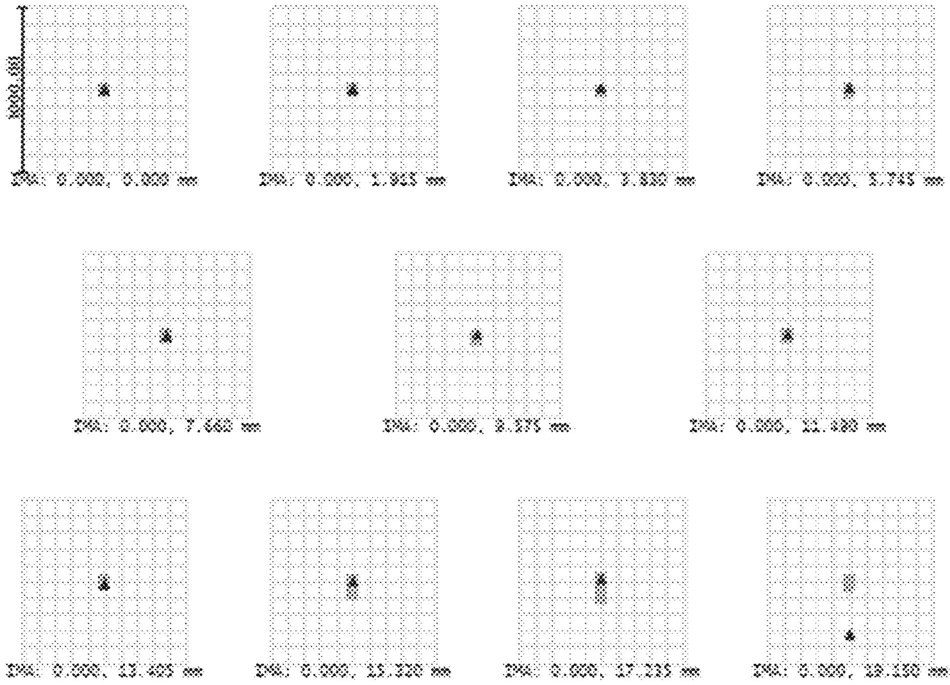
FIG. 12 is a spot diagram of the optical module according to Embodiment 1 when the eye track is ±4.
Figure 13:
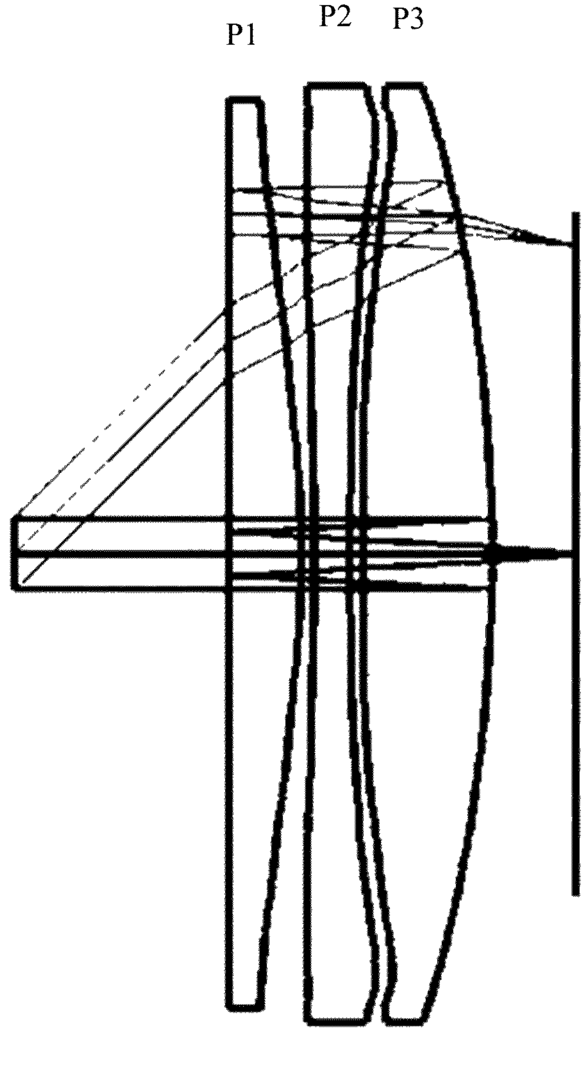
FIG. 13 is a light path diagram of the optical module according to Embodiment 1 under a diopter of 4D.
Figure 14:
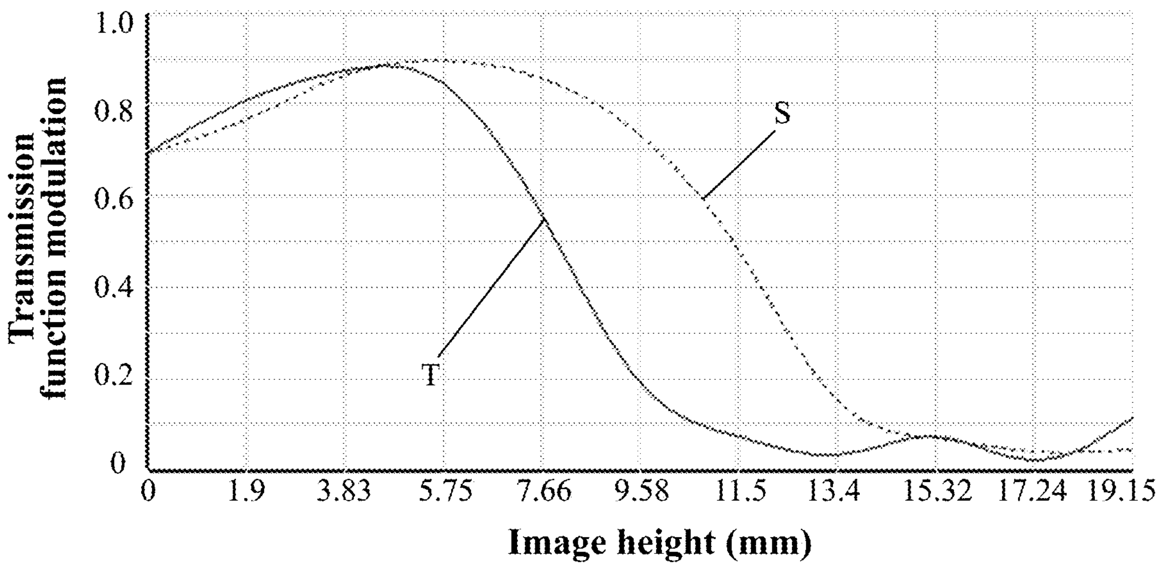
FIG. 14 is an MTF diagram of the optical module according to Embodiment 1 under the diopter of 4D.
Figure 15:
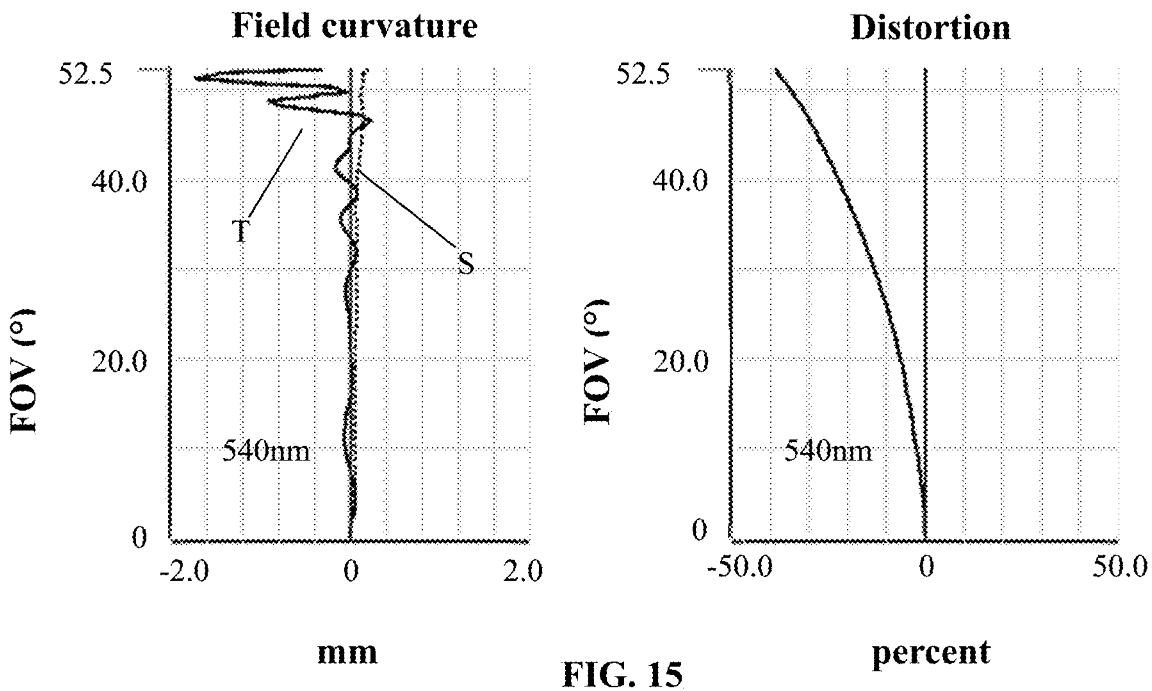
FIG. 15 is a schematic diagram of a field curvature and a distortion of the optical module according to Embodiment 1 under the diopter of 4D.
Figure 17:
FIG. 17 is a spot diagram of the optical module according to Embodiment 1 under the diopter of 4D.
Figure 17:
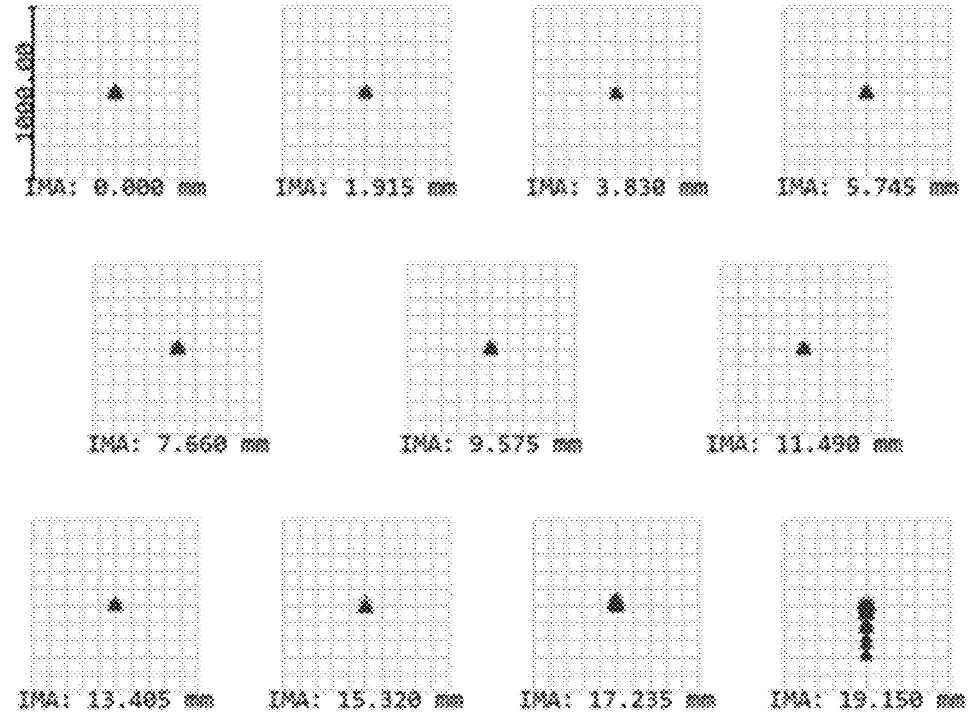
Figure 18:
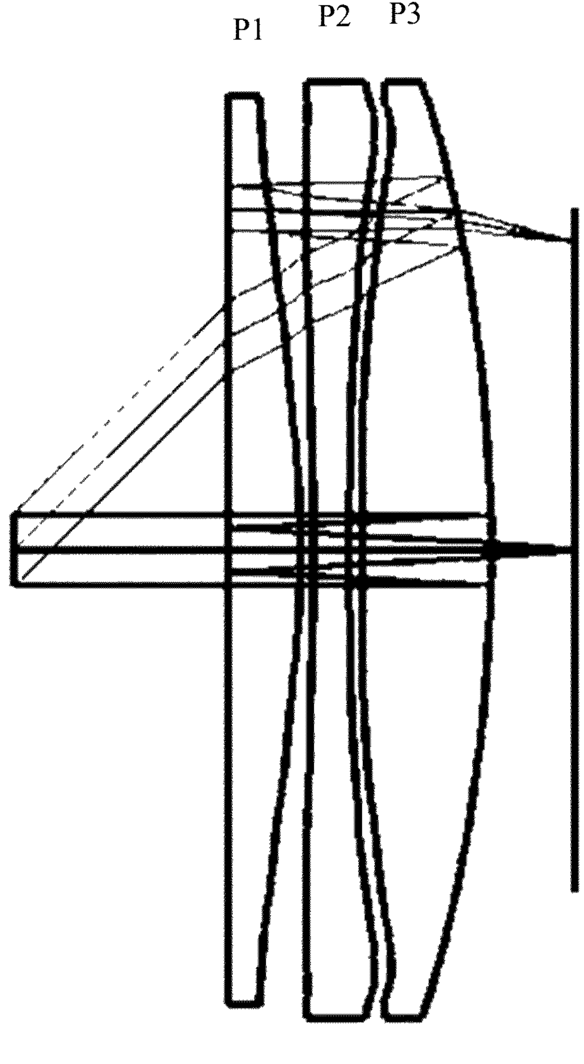
FIG. 18 is a light path diagram of the optical module according to Embodiment 1 under a diopter of 7D.
Figure 19:
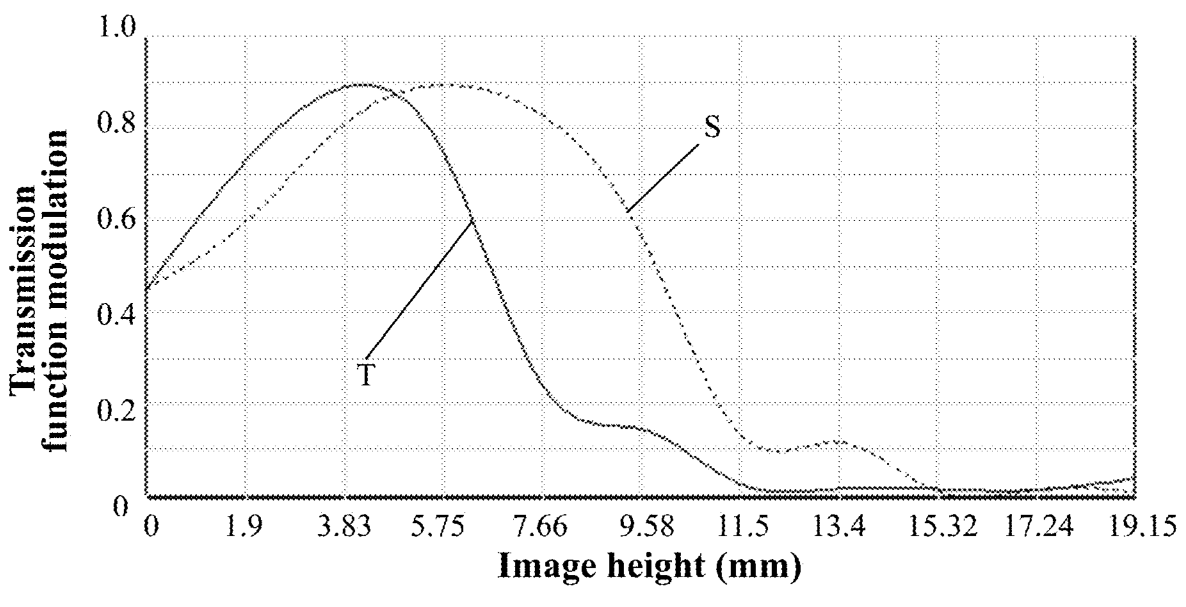
FIG. 19 is an MTF diagram of the optical module according to Embodiment 1 under the diopter of 7D.
Figure 20:
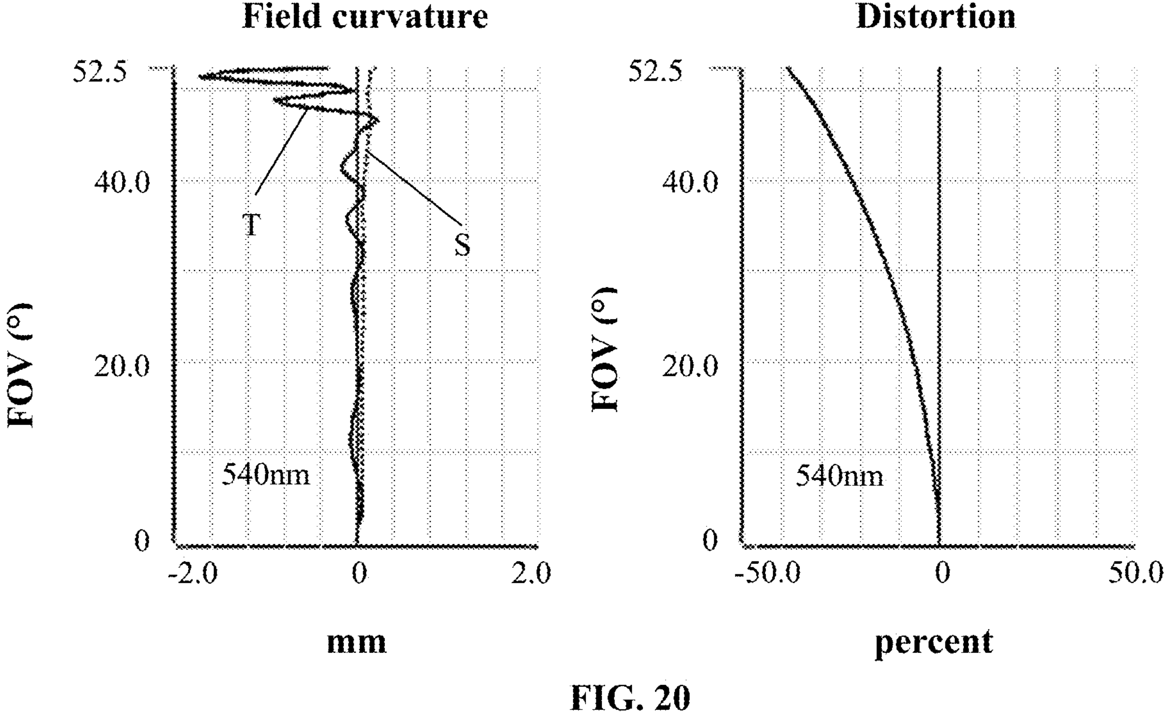
FIG. 20 is a schematic diagram of a field curvature and a distortion of the optical module according to Embodiment 1 under the diopter of 7D.
Figure 22:
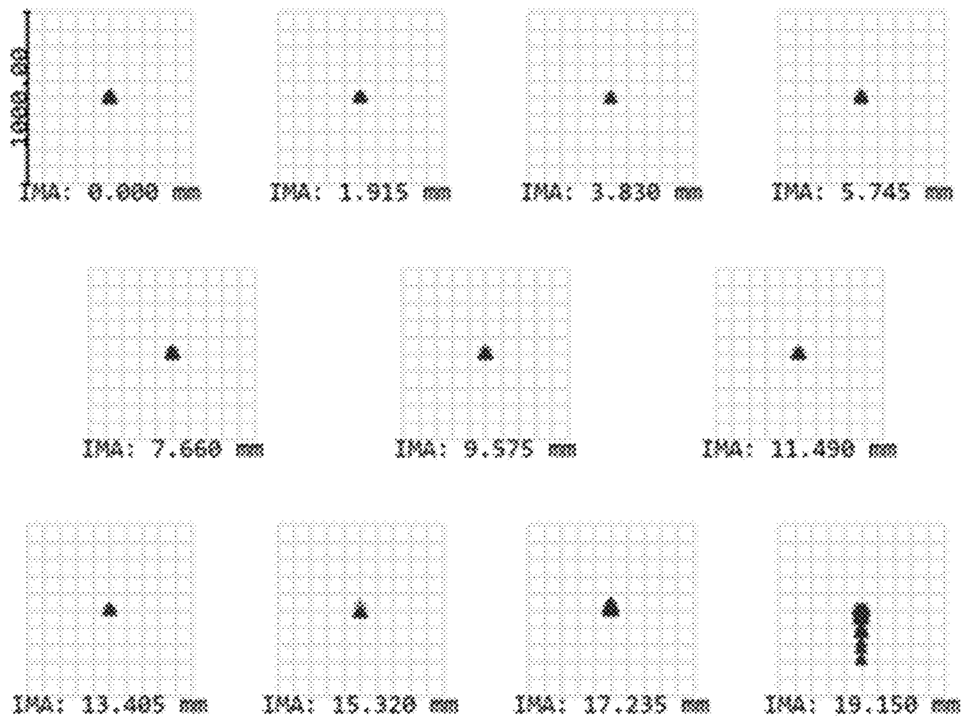
FIG. 22 is a spot diagram of the optical module according to Embodiment 1 under the diopter of 7D.

FIG. 7 respectively illustrate a spot diagram of lights having wavelengths of 630 nm, 540 nm, 450 nm after passing the optical module 10 according to Embodiment 1 under the diopter of 0. FIG. 12 respectively illustrate a spot diagram of lights having wavelengths of 630 nm, 540 nm, 450 nm after passing the optical module 10 according to Embodiment 1 when the eye track is ±4. FIG. 17 respectively illustrate a spot diagram of lights having wavelengths of 630 nm, 540 nm, 450 nm after passing the optical module 10 according to Embodiment 1 under the diopter of 4D. FIG. 22 respectively illustrate a spot diagram of lights having wavelengths of 630 nm, 540 nm, 450 nm after passing the optical module 10 according to Embodiment 1 under the diopter of 7D.

In the present disclosure, with regard to the optical module 10 in Embodiment 1, optical function tests are performed under varied diopters. As shown in FIGS. 2 to 21, the optical module 10 provided in Embodiment 1 of the present disclosure may not only correct field curvature and distortion well to improve image quality, but may also achieve high resolution, satisfying an imaging requirement of high quality. At an Eyebox edge, i.e., when Eye Shift=±4, a lens has good full field view, which can improve a display experience of a user when a VR device position is not well adjusted, and supports adjustments under a diopter of 0-7D, providing a myopia user with an outstanding display experience.

Embodiment 2

Embodiment 2 of the present disclosure provides a VR device including the optical module 10. The above embodiment may be referred to for a particular structure of the optical module 10. Because the entire technical solution of the above embodiment is applied in this VR device, the VR device at least has all effective results of the technical solution in the above embodiment, which is not repeated herein.

It can be appreciated by one having ordinary skill in the art that the description above is only embodiments of the present disclosure. In practice, one having ordinary skill in the art can make various modifications to these embodiments in forms and details without departing from the scope of the present disclosure.

What is claimed is:

1. An optical module, applied to a virtual reality VR device and comprising, from an image side to an object side: a first lens, a second lens and a third lens; wherein a lamination film is attached on an image-side surface of the first lens, the lamination film comprising, from the image side to the object side, a reflective polarizing film and a quarter waveplate film; an object-side surface of the third lens is coated with a transflective film; and the optical module further satisfying following conditions:

$$1.00 \leq f23/f \leq 1.50;$$

$$\text{MAX } SD \leq 27.00 \text{ mm};$$

$$\text{Eyebox} \geq 12.00 * 12.00 \text{ mm};$$

$$40.00\% \leq T \leq 60.00\%; \text{ and}$$

$$40.00\% \leq F \leq 60.00\%$$

where f denotes a focal length of the optical module, f23 denotes a combined focal length of the second lens and the third lens, MAX SD denotes a maximum semi-caliber of a lens of the optical module, Eyebox denotes an eye box size of the optical module, T denotes a transmissive rate of the transflective film; and F denotes a reflective rate of the transflective film.

2. The optical module according to claim 1, wherein an image-side surface of the first lens is a plane surface, and an image-side surface and an object-side surface of the second lens are both aspherical surfaces.

3. The optical module according to claim 1, satisfying following condition:

$$90.00° \leq FOV \leq 110.00°,$$

where

FOV denotes a field of view of the optical module.

4. The optical module according to claim 1, satisfying following conditions:

$$TTL \leq 15.00 \text{ mm; and}$$

$$TTL/f \leq 0.70;$$

wherein

TTL denotes an on-axis distance from the image-side surface of the first lens to an object-side surface of the third lens.

5. The optical module according to claim 1, wherein the reflective polarizing film has a transmissive rate greater than or equal to 95%.

6. The optical module according to claim 1, having an optical distortion less than or equal to 35%.

7. The optical module according to claim 1, having a chromatic aberration less than or equal to 100 μm.

8. The optical module according to claim 1, having a diopter with an adjustment range of 0-7D.

9. A VR device, comprising an optical module according to claim 1.

* * * * *